Nov. 13, 1951 R. J. MORCOM 2,575,227
GAUGING DEVICE FOR GLASS CONTAINERS AND THE LIKE
Filed May 3, 1947
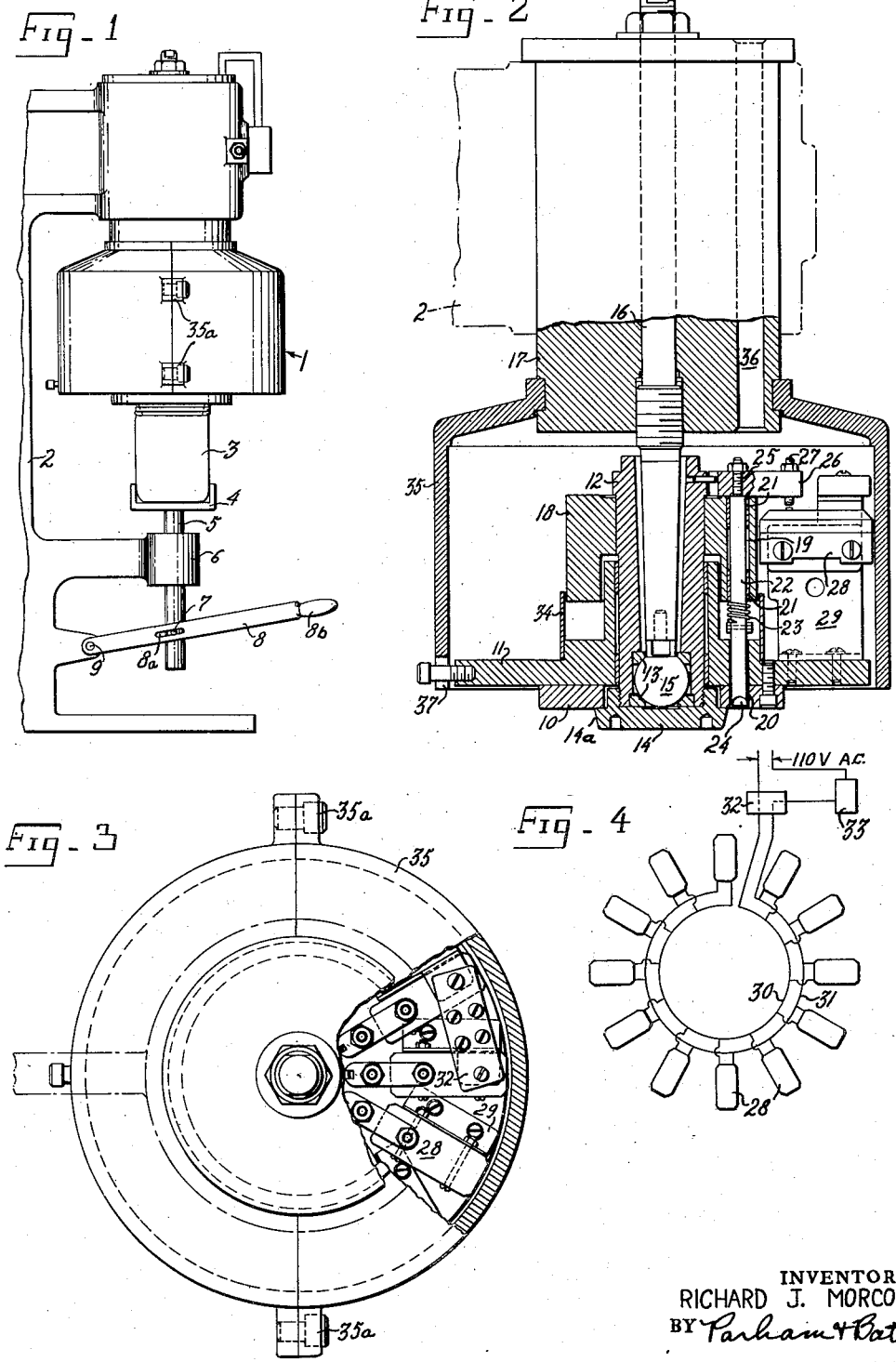
INVENTOR
RICHARD J. MORCOM
BY Parham & Bates
ATTORNEYS Patented Nov. 13, 1951

2,575,227

UNITED STATES PATENT OFFICE 2,575,227

GAUGING DEVICE FOR GLASS CONTAINERS AND THE LIKE

Richard J. Morcom, West Hartford, Conn., assignor to Emhart Manufacturing Company, a corporation of Delaware Application May 3, 1947, Serial No. 745,702

4 Claims. (Cl. 73—104)

This invention relates generally to improvements in gauging devices and more particularly to devices for checking the flatness of annular top sealing surfaces of glass containers and like articles.

It is an object of the present invention to provide relatively simple, inexpensive gauging means for rapidly ascertaining and automatically indicating certain deviations of a glass container or similar article from a predetermined standard of dimensional accuracy.

More specifically, it is an object of the present invention to provide a gauging device for ascertaining deviations of annular sealing surfaces of glass containers and like articles from a predetermined standard of flatness.

Another object of the present invention is to provide a device for ascertaining and automatically indicating the presence of a crevice or depression in a flat, annular top face of the finish portion of a glass container or other similar article.

A still further object of the present invention is to provide a device which may be used to ascertain the presence of a seam or other projection above the plane of a flat top face of the finish portion of a glass container or other article.

Other objects and advantages of the present device will become apparent or be pointed out in the course of the following description of a preferred embodiment of the present invention which is illustrated in the attached drawings, in which:

Fig. 1 is an elevation view of the apparatus of the preferred embodiment in gauging relationship with a glass container being inspected;

Fig. 2 is a relatively enlarged view of a gauging head which is a component of the apparatus shown in Fig. 1, the view showing certain portions of the gauging head in vertical section in order to reveal the construction thereof, the relatively movable parts of the gauging head being shown in their inactive or non-gauging positions;

Fig. 3 is a plan view of the gauging head, a portion thereof being broken away to show internal structure; and Fig. 4 is a schematic view of a plurality of electrical switches and an operatively associated electrical circuit which cooperate with other mechanism of the gauging head to detect and indicate the presence of defects in containers being inspected.

The apparatus of the preferred embodiment disclosed herein is constructed and arranged to detect deviations from planarity of a substantially flat, annular top sealing surface of a glass container, such as a home canning jar having at the top of its finish portion a flat sealing face on which an annular gasket may be clamped to form a seal by means of a glass cap or other suitable closure. It is apparent that any deviation of such a sealing face from planarity may cause the closure and gasket associated therewith to seat improperly, thereby permitting access of the air to the interior of the container and spoilage of food products or other substances contained therein. The apparatus of the present invention may be used to detect such deviations as are of a serious enough nature to render the use of the container undesirable, the herein disclosed device being particularly well adapted for use in a glassware manufacturing plant to detect defective containers produced by glassware forming machines. Food packing and processing establishments also may use the present invention to advantage in guarding against spoilage resulting from the use of defective containers.

The apparatus illustrated in the accompanying drawings consists essentially of a supporting framework which is constructed and arranged to clamp a gauging head in position to facilitate inspection of glass containers. The gauging head has a horizontally disposed movable gauge plate and a plurality of gauge rods cooperatively positioned with respect to the gauge plate in such a fashion that the gauge rods are disposed normal to it and extend downwardly therethrough so as to ride on the annular top sealing surface of a container being inspected when the container is forced upwardly to bring its sealing face in contact with the lower surface of the gauge plate. The gauge rods may project below such lower surface of the gauge plate to an extent permitted by the deviations of the sealing face from planarity, the rods actuating one or more of a plurality of cooperatively positioned electrical switches, the actuation of any one of which may complete an associated electrical circuit which may be arranged to energize a signaling device or an alarm, whereby to indicate the presence of a defective container to an attendant.

Referring first to Fig. 1, the apparatus of the preferred embodiment comprises a gauging head, generally designated 1, which is maintained in a preferred position by a rigid supporting structure 2, a glass container 3 being held beneath and adjacent to the gauging head for inspection purposes by means of a vertically movable platform 4 which is secured to a depending rod 5 slideably retained in boss 6 of supporting structure 2. A pin 7 may be fixed in a lower portion of depending rod 5 and may be cooperatively engaged in a slot 8a of a lever 8 one end of which is pivotally secured at 9 to the rigid supporting structure. A handle 8b is formed on the outer end of lever 8 and may be grasped by an attendant and raised, thereby raising glass container 3 into gauging relationship with gauging head 1. After inspection of the glass container has been completed, lever 8 may be lowered, thereby lowering glass container 3 away from the gauging head.

As shown in Fig. 2, the gauging head comprises a gauge plate 10 which is secured to a mounting plate 11 which is guided for vertical movements on a tubular support member 12. Tubular support member 12 retains within its bore a pair of spherically faced washers 13, the washers being confined within the bore by a cap nut 14 which is threadedly engaged with member 12. The spherically faced washers 13 are cooperatively disposed to a spherical end 15 of a rod 16 which is adjustably secured in a mounting block 17 which may be held in position by the supporting structure. The spherical washers and spherical end of the rod cooperate to form, in effect, a swivel joint which permits swiveling of mounting plate 11 and tubular member 12 as a unit to a limited extent in any direction about the center point of spherical end 15. Mounting plate 11 may also be raised and lowered to a limited extent relative to tubular member 12 by virtue of its guided relationship with tubular support member 12. Gauge plate 10 moves with plate 11.

An annular support member 18 is fixed to the upper portion of tubular support member 12 and is formed to define a plurality of vertical holes therein, one of which is shown at 19, which are aligned axially with a corresponding number of holes 20 formed in members 10 and 11. A pair of bushings 21 may be provided in the hole 19 in position to guide a gauge rod 22, which is concentrically positioned within the aligned holes 19 and 20. The rods are urged downwardly at all times by conventional spring means, as at 23. Each of the gauge rods may be formed at its lower end into a knife edge, as shown at 24. The upper ends of the gauge rods may be threaded, as shown at 25, each gauge rod carrying one of a plurality of guided blocks, such as 26, having depending adjustable actuating screws 27 which are cooperatively disposed to a corresponding number of commercially available, normally open electrical switches 28. The latter are radially disposed about the vertical center line of the gauging head, as shown in Fig. 3, and are secured to brackets 29 which are fixed to mounting plate 11, as shown in Fig. 2. It has been found to be advantageous to use very sensitive electrical switches in the present device similar to the micro-switches manufactured by the micro-switch division of the First Industrial Corporation of Freeport, Illinois. The blocks 26 and the rods 22 depending therefrom may have limited guided vertical movements relative to the other parts of the gauging head. The springs 23 tend to keep the rods 22 pulled downward in the support member 18 to a limit determined by the contact of the blocks with the top of part 18, as shown in Fig. 2.

The preferred embodiment of the present invention, used for purposes of illustration, incorporates twelve guided gauge rods with twelve cooperatively positioned electrical switches. Although this number has been found to be satisfactory in practice, it should be noted that the number of gauge rods and cooperating switches that is used is a matter of preference and not of limitation.

As shown in Fig. 4, the twelve switches may be connected by wires 30 and 31 in parallel so that, if an electrical connection is made between the two wires by any one of the plurality of switches, the circuit, incorporating terminal block 32 and a conventional alarm or signaling device 33, may be completed to energize the alarm or signaling device. Terminal block 32 has been provided in the present invention primarily to facilitate the making of electrical connections to the parallel circuit of the switches, although it will be obvious to those skilled in the art that the terminal block may be dispensed with if this is considered desirable from a structural standpoint.

A dust shield 34 may be provided on mounting plate 11 in position to overlap support member 18 so as to prevent the passage of dust and other foreign matter to the lower ends of the gauge rods and associated mechanism. To protect the mechanism of the gauging head, a housing 35 may be secured to mounting block 17 by conventional means, such as shown at 35a. A vertical channel 36 may be formed in mounting block 17 to facilitate the passage of electrical wires from the outside of the gauging head to the terminal block. Conventional means, such as shown at 37, may be provided, if desired, to prevent mounting plate 11 from rotating about the vertical center line of the gauging head, thus preventing twisting or damaging of the wires which are connected to the terminal block.

A feature of the present invention is the provision of a vertically tapering lateral face 14a on cap nut 14 to guide a container, being inspected, to a centralized position adjacent to the gauge plate. As shown in Fig. 1, the container is raised by lever 8 until the flat, annular top sealing face of the container contacts the lower flat face of the gauge plate, the gauge plate, mounting plate, and related members swiveling about the center of spherical end 15, if required for such contact. As the container continues to be raised, mounting plate 11, carrying the electrical switches which are rigidly secured thereto by brackets 29, is moved upwardly correspondingly. During the initial part of this upward motion, the switches are moved closer to the associated adjustable actuating screws 27. However, before the switches come into actuating contact with the adjusting screws, the knife edges of at least some of the gauge rods will come into contact with the annular sealing face of the container, the switches and these gauge rods then being moved upwardly thereafter simultaneously.

If the top sealing face of the container should not be flat, it will not contact evenly and squarely against the lower surface of the gauge plate, gaps or air spaces thus existing at places between the face of the container and the face of the gauge plate. The gauge rods above these places, under the influence of the conventional spring means shown in Fig. 2, will project below the lower face of the gauge plate by amounts dependent upon the vertical extents of the air spaces between the relatively depressed portions of the top sealing surface of the container and the gauge plate. If any such air space should be greater in vertical extent than a predetermined permissible amount, the gauge rod, corresponding in position thereto, will project below the gauge plate by an amount sufficient to cause the adjustable actuating screw 27 associated therewith to contact and actuate the associated switch, thereby closing such normally open switch and completing the circuit to energize the alarm or signaling device, as has been described hereinbefore.

The present device may also be used to inspect containers for crevices and other depressions in their top sealing surfaces. When used for this purpose, the foregoing step of raising the container may be followed. However, after the container is in gauging position, it is rotated about its vertical axis by hand or any other suitable means. If a crevice or depression exists in the top surface of the container, the knife edge of one of the gauge rods will move downward on encountering it. Such downward movement of a gauge rod will energize the signaling means and cause the container to be rejected by the attendant.

If the container, being inspected, has a seam or other projection above its flat sealing face, the container will not seat squarely on the gauge plate due to the interference of the projection therewith and, as described before, a downwardly projected gauge rod will then actuate its switch to energize the signaling means.

It has been found advantageous in practice to use gauge rods having their lower ends formed into knife edges. The use of such gauge rods, however, does not constitute a limitation of the present invention, other forms of gauge rods being as apposite for use in the device. If desirable for the detection of certain types of defects in the containers being inspected, gauge rods, having sharply pointed lower ends or ends of any other preferred configuration, may be substituted for the knife-edged gauge rods.

From the foregoing description, it will be obvious that the present device may be used advantageously to inspect sealing top faces of containers and other articles for many types of distortions and imperfections. It will also be obvious to those skilled in the art that by adjustment of actuating screws 27, the sensitivity of the present device in detecting defects of the type herein mentioned may be varied at will within limits.

In view of the foregoing disclosure, many modifications of the present invention will be obvious to those skilled in the art and may be made without departing from the spirit and scope of the invention as defined by the hereunto appended claims.

I claim:

1. An article inspection device comprising a supporting structure, a support member swivelly mounted on said supporting structure, a gauge plate slideably mounted on said support member, a plurality of movable gauge rods slideably retained by said support member and extending through said gauge plate, article supporting means carried by the supporting structure, means to produce relative motion between said gauge plate and the article supporting means to bring the article supported by the latter into gauging relationship with the gauge plate and related gauge rods, and means secured to said gauge plate and operatively associated with the gauge rods to indicate the presence of a defect in the article being inspected.

2. Apparatus as defined in claim 1 wherein said last named means comprises a plurality of electrical switches cooperatively positioned relative to said gauge rods, and a signaling device operatively associated with said switches.

3. In an article inspection device, a gauging head comprising a supporting structure, a depending rod adjustably secured to said supporting structure, a support member swivelly mounted on said depending rod, a mounting plate slideably secured to said support member, a gauge plate secured to said mounting plate, said gauge plate having an exposed flat bottom surface, an annular member secured to said support member above said gauge plate, a plurality of gauge rods slideably retained by said annular member and extending downwardly through said gauge plate, article supporting means mounted on said supporting structure so as to dispose an article thereon below and approximately in line with the gauge plate and for vertical movements relative thereto to and from position to bear against said bottom surface of the gauge plate and against the lower ends of the gauge rods extending through said gauge plate, means to effect said vertical movements of said article supporting means, means to centralize an article supported by said article supporting means relative to said gauge plate, and signalling means operatively associated with said gauge rods and said mounting plate to indicate the presence of a defective upper surface of said article as determined by contact of a gauge rod therewith when said article is in gauging position in respect to said gauge plate.

4. Apparatus as defined in claim 3 in which said last named means comprises a plurality of electrical switches cooperatively positioned relative to said gauge rods and secured to said mounting plate, and a signaling device operatively associated with said switches.

RICHARD J. MORCOM.

REFERENCES CITED

The following references are of record in the file of this patent:

UNITED STATES PATENTS

| Number | Name | Date |
|---|---|---|
| 1,431,704 | Smith | Oct. 10, 1922 |
| 1,894,025 | Dennison et al. | June 10, 1933 |
| 1,992,987 | Bitzer et al. | Mar. 5, 1935 |
| 2,011,931 | Dreyer | Aug. 20, 1935 |
| 2,074,753 | McClain | Mar. 23, 1937 |
| 2,093,429 | Foss | Sept. 21, 1937 |
| 2,161,704 | Foster | June 6, 1939 |
| 2,271,739 | Link | Feb. 3, 1942 |
| 2,322,343 | Brandon | June 22, 1943 |
| 2,327,629 | Fedorchak | Aug. 24, 1943 |
| 2,331,987 | Leatherman | Oct. 19, 1943 |